United States Patent [19]

Kaneko et al.

[11] 4,265,288

[45] May 5, 1981

[54] PNEUMATIC SAFETY TIRE WITH EXCELLENT LONG-RUNNING ABILITY AFTER PUNCTURE EMPLOYING RUBBER HAVING SPECIFICALLY DEFINED PROPERTIES FOR SIDEWALL INSERTS AND TREAD

[75] Inventors: Yoshio Kaneko, Tokorozawa; Makoto Yamauchi, Fussa; Shinji Shiozawa, Kodaira; Yoshihiro Hayakawa, Akigawa; Fumio Banba, Kodaira, all of Japan

[73] Assignee: Bridgestone Tire Co., Ltd., Tokyo, Japan

[21] Appl. No.: 92,302

[22] Filed: Nov. 8, 1979

[30] Foreign Application Priority Data

Nov. 20, 1978 [JP] Japan ............... 53/143001

[51] Int. Cl.³ .................. B60C 17/00; B60C 11/00; B60C 9/20
[52] U.S. Cl. .................. 152/209 R; 152/330 RF; 152/353 R; 152/361 FP; 152/361 DM; 152/374
[58] Field of Search .......... 152/209 R, 209 A, 209 B, 152/209 NT, 209 WT, 330 RF, 352 R, 352 A, 353 R, 353 C, 353 G, 357 R, 357 A, 360, 374, 361 R, 361 FP, 361 DM

[56] References Cited

U.S. PATENT DOCUMENTS

| | | | |
|---|---|---|---|
| 3,881,538 | 5/1975 | Mirtain | 152/361 FP |
| 3,954,131 | 5/1976 | Hoshino et al. | 152/330 RF X |
| 3,982,580 | 9/1976 | Inoue et al. | 152/361 DM X |
| 4,067,374 | 1/1978 | Alden et al. | 152/330 RF X |
| 4,193,437 | 3/1980 | Powell | 152/330 RF |

*Primary Examiner*—John T. Goolkasian
*Assistant Examiner*—Lois E. Boland
*Attorney, Agent, or Firm*—Sughrue, Rothwell, Mion, Zinn and Macpeak

[57] ABSTRACT

A pneumatic safety tire with a pair of annular rubber reinforcements having crescent sectional shape and applied to a tire carcass at tire sidewalls, the rubber of the reinforcements having a JIS hardness of not less than 70, a tensile stress ($Mod_{25}$) after an aging test of not less than 10 kg/cm², and a repulsive elasticity by Dunlop tripsometer of not less than 65%.

5 Claims, 1 Drawing Figure

U.S. Patent May 5, 1981 4,265,288
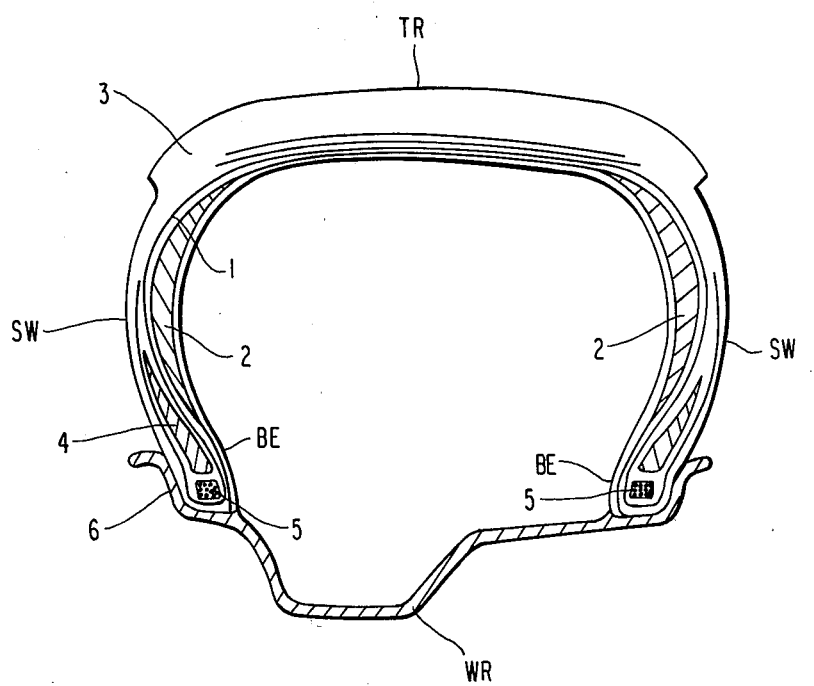

PNEUMATIC SAFETY TIRE WITH EXCELLENT LONG-RUNNING ABILITY AFTER PUNCTURE EMPLOYING RUBBER HAVING SPECIFICALLY DEFINED PROPERTIES FOR SIDEWALL INSERTS AND TREAD

BACKGROUND OF THE INVENTION

1. Field of the Invention

This invention relates to a pneumatic safety tire with excellent long-running ability after puncture.

2. Description of the Prior Art

A pneumatic safety tire is designed to ensure continuous safe running after puncture (to be referred to as "run-flat" condition, hereinafter) until reaching a place where replacement or repair of the punctured tire in a reliable and secure fashion. This occurs by having a means built in the tire for bearing the wheel load acting on the tire instead of bearing it by internal pneumatic pressure of the tire, which internal pneumatic pressure is normally maintained in the inner hollow space of the tire at a predetermined level but lost upon sudden occurrence of the puncture. What is meant by the "wheel load" is the total load applied to one third wheel from a vehicle to which the tire is mounted. Various types of the means for bearing the wheel load in case of tire puncture are known; for instance, U.S. Pat. No. 3,954,131 granted to BRIDGESTONE TIRE COMPANY LIMITED on May 4, 1976 teaches rubber reinforcements of sidewalls which provide run-flat condition ability without deteriorating regular performance before the puncture, especially without requiring any reduction of normal running speed.

In short, the aforesaid means of the prior art for bearing the wheel load upon occurrence of a puncture uses rubber reinforcements of crescent cross sectional shape made of an elastomer having a comparatively high elasticity and mounted primarily to the inner surface of tire sidewall portions to extend from bead portions to hump portions of the tire, the maximum thickness of each rubber reinforcement being less than 15%, preferably 3% to 9% of the maximum tire section width under inflated condition. The rubber reinforcements provide extra rigidity to the tire sidewall portions, for bearing the wheel load after tire puncture by the thus reinforced tire sidewalls instead of bearing the wheel load by the internal pneumatic pressure of the tire.

The aforesaid safety tire of the prior art, however, has a shortcoming in that it is difficult to determine criteria for setting an upper limit of the distance within which the run-flat condition is allowed while ensuring reproduction of the proper performance characteristics inherent to the tire by repairing the puncture. This is because the required distance to be covered by the run-flat is generally unknown and the time when the puncture is recognized is also uncertain. Accordingly, there is a tendency of using an excessive run-flat condition leading to breakage of the tire, or undertaking dangerous tire change operations on a road because of fear of tire breakage. Thus, the function of the safety tire has not been fully utilized.

SUMMARY OF THE INVENTION

To obviate the aforesaid shortcoming, the inventors carried out special studies on tire breakage caused by the run-flat condition.

Generaly speaking, the main cause of the tire breakage due to the run-flat condition is heat, and it is important to find out how to reduce the heat. The tire breakage due to running after occurrence of a tire puncture proceeds in the following manner.

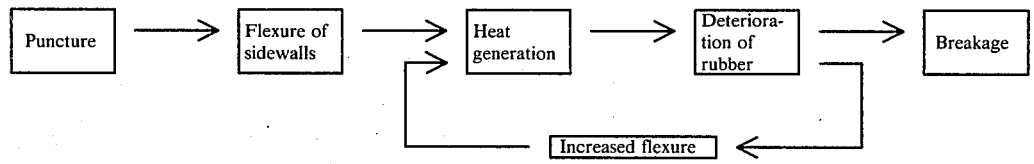

Therefore, the suppression of heat generation and prevention of thermal deterioration are essential for achieving a substantial improvement in the run-flat condition ability.

With the aforesaid point in mind, the inventors analyzed the run-flat condition ability from various angles, especially physical properties of rubber relating to the run-flat condition ability: such as hardness of rubber which is sufficient for bearing the wheel load with comparatively thin rubber reinforcements for the tire sidewalls while improving the heat dissipation. This is contrasted to comparatively thick rubber reinforcements of the prior art for strengthening the tire: the tensile stress of rubber after an aging test, which tensile stress plays an important role in suppressing deterioration of the rubber or ensuring a high heat-resistance of the rubber; and the repulsive elasticity of the rubber which contributes to the suppression of heat generation in the rubber. As a result, the inventors have succeeded in effectively improving the durability of run-flat condition ability.

The inventors also noted that, with a safety tire whose sidewalls are provided with the aforesaid rubber reinforcements, repeated deformations of the tread portion of the tire during the run-flat tend to cause a gradual breakdown of tread rubber, especially at boundaries between the tread rubber and edges of a belt layer embedded therein, mainly due to deterioration caused by heat generation by shearing forces and shearing strains and the ensuring heat accumulation at the edges of the belt layer. To solve this problem, the physical properties of the rubber materials for the tread portion, particularly the repulsive elasticity of the rubber, were analyzed from the standpoint of the contribution of such physical properties to the suppression of heat generation. Consequently, the present invention has succeeded in preventing the gradual breakdown at the tread portion and in further effectively improving the durability of the run-flat condition ability. In addition, the inventors have found out that folding the belt layer edges or the use of special caps at the edges of the belt layer in constructing the tread portion is very effective in preventing the breakdown of the tread rubber.

More particularly, in the folded construction of the belt layer, the belt layer is formed of one or more carcass side belts of a certain width and one or more tread side belts of a different width. All the belts are overlaid one on the other with the center lines thereof aligned and those edge portions of the wider belt or belts which extend beyond the narrower belt or belts are folded around the edges of the narrower belt or belts onto the latter belt or belts. Preferably, all the belts consist of steel cords, or the belt or belts of one of the aforesaid two sides consist of KEVLAR (a trademark of Du Pont de Nemour and Company) cords. On the other hand, in the capped construction of the belt layer, steel cord belts are overlaid with wide belt or belts on the inside and narrow belt or belts on the outside, and cloths made of organic fiber cords, such as nylon cords, are applied to each belt so as to cover at least opposite edges of each belt.

BRIEF DESCRIPTION OF THE DRAWING

A sole FIGURE shows one embodiment of a pneumatic safety tire with excellent long-running ability after puncture according to the invention. The tire shown in the drawing comprises a pair of annular bead portions BE, a carcass 1 extending across the two bead portions, an annular tread portion TR formed on the outer peripheral surface of the carcass, a pair of sidewalls SW between one of the bead portions and corresponding one of opposite edges of said tread portion, a pair of side portion reinforcing layers 2 mounted to the sidewalls for enhancing rigidity thereof so as to give an ability to bear load on the tire independently, and a tread reinforcing belt layer 3 embedded in tread rubber forming the tread portion while surrounding the carcass. Reference numeral 4 designates a bead filler rubber, reference numeral 5 a pair of bead wires, reference letters WR a wheel rim and reference numeral 6 a rim flange.

DESCRIPTION OF THE PREFERRED EMBODIMENTS

With the present invention, a considerable improvement of the running durability after puncture of a safety tire is achieved by using improved sidewall-reinforcing rubber members for the tire, while considering the aforesaid points, which sidewall-reinforcing rubber members 2 are made by using a rubber composition consisting of a blend rubber of natural rubber NR and butadiene rubber BR as a main ingredient and suitable additives selected from the group of carbon black, stearic acid, zinc white, oil, sulfur, and one or more accelerators for vulcanization.

For reference, the running durability after puncture of two conventional safety tires of sizes 195/60-15 and 185/70-14 were measured by drum tests, which tires were provided with sidewall-reinforcing rubber members made of comparatively soft rubber (with a JIS hardness of 55) being free from any serious heat-generating problem and comprising a blend of natural rubber NR and butadiene rubber BR added with a small of SBR. The result was 14 km and 18 km, respectively. Here, the "running durability after puncture" was determined by the following test; namely, the tire being tested was pressed against a test drum at a predetermined load, i.e., 335 kg (equivalent to a wheel load of 450 kg) for the tire size 195/60-15 and 275 kg (equivalent to a wheel load of 385 kg) for the tire size 185/70-14, with the air inlet valve of the tire fully open. The drum was run at a peripheral speed of 80 km/hour until the tire was broken, and the distance thus run before the tire breakage was determined as the running durability after puncture of that tire. The maximum thickness of the sidewall-reinforcing rubber member corresponded to 4.4% (one side only, 1,160 grams) of the maximum tire section width under fully inflated condition for the tire size 195/60-15 and 4.1% (one side only, 750 grams) of the maximum tire section width under fully inflated condition for the tire size 185/70-14. The same maximum thicknesses of the sidewall-reinforcing rubber members were used in different specimens to be referred to in the specification.

Test specimens 1 of the aforesaid two tire sizes were made by forming the sidewall-reinforcing rubber members of the same thicknesses as those of the aforesaid conventional reference tires with a rubber of JIS hardness of 75 consisting of increased amounts of butadiene rubber BR and SBR and a reduced amount of natural rubber NR. Drum tests on these test specimens 1 showed fairly improved running durabilities after puncture, namely 50 km and 63 km for the tire sizes 195/60-15 and 185/70-14, respectively.

In addition, test specimens 2 of the aforesaid two tire sizes were made by forming the sidewall-reinforcing rubber members of the same thickness as those of the aforesaid conventional reference tires with a blend rubber of JIS hardness of 77 consisting of a blend rubber containing a further increased amount of butadiene rubber BR but without SBR. Drum tests on those test specimens 2 showed low running durabilites after puncture, namely 29 km and 36 km for the tire sizes 195/60-15 and 185/70-14, respectively.

Table 1 shows the measured values of physical properties of rubbers in the tires thus tested, together with a tabulation of the aforesaid running durabilities after puncture of the reference and test specimen tires.

A comparative study of the aforementioned test results on the conventional reference safety tires and similar test specimens indicate that, to improve the running durability after puncture, in addition to the provision of a required rigidity while ensuring good heat dissipation by using thin sidewall-reinforcing rubber members with a rubber of high hardness, it is also necessary to improve the heat resistance of the rubber for the sidewall-reinforcing rubber members. Especially necessary are improvements of both the tensile stress after aging and the repulsive elasticity contributing to the suppression of heat generation.

TABLE 1

| | | Tire tested | | |
|---|---|---|---|---|
| Item | | Conventional, reference | Test specimen 1 | Test specimen 2 |
| JIS hardness | | 55 | 75 | 77 |
| Tensile stress $Mod_{25}$ (kg/cm$^2$) | before aging | 6.0 | 15.0 | 19.0 |
| | after aging | 3.5 | 13.0 | 8.0 |
| | retaining factor (%) | 58 | 87 | 42 |
| Repulsive elasticity by Dunlop tripsometer (%) | | 66 | 59 | 75 |
| Running durability after puncture (km) | 195/60-15 | 14 | 50 | 29 |
| | 185/70-14 | 18 | 63 | 36 |

Various compositions of the rubber for the sidewall-reinforcing rubber members were prepared and tested, while using the composition of the test specimen 2 as a reference, which reference composition consisted of 70 parts of natural rubber NR, 30 parts of butadiene rubber BR, 75 parts of carbon black FEF, 3 parts of stearic acid, 3 parts of zinc white, 8 parts of oil, 6 parts of sulfur, and 1.0 part of accelerator for vulcanization. The effects of increasing the amount of butadiene rubber BR were particularly checked. Rubber specimens No. 1 through No. 5 were prepared as shown in Table 2, and similar tires to those of Table 1 were made while using the rubber specimens in the sidewall-reinforcing rubber members of the same thickness as those of the tires of Table 1. Drum tests were carried out on the tires using the rubber specimens No. 1 through No. 5 for checking the running ability after puncture thereof, and the results are also shown in Table 2. As can be seen from Table 2, the running durability after puncture was greatly improved by using the rubber compositions of Table 2.

TABLE 2

| Rubber specimens No. | | 1 | 2 | 3 | 4 | 5 |
|---|---|---|---|---|---|---|
| JIS hardness Hd | | 71 | 73 | 79 | 74 | 77 |
| Tensile stress $Mod_{25}$ (kg/cm$^2$) | before aging | 17.3 | 17.0 | 21.4 | 17.0 | 20.5 |
| | after aging | 10.5 | 12.0 | 15.2 | 16.5 | 16.3 |
| | retaining factor (%) | 61.0 | 70.6 | 71.0 | 97.0 | 79.5 |
| Repulsive elasticity by Dunlop tripsometer (%) | | 75 | 77 | 73 | 71 | 81 |
| Running durability after puncture (km) | 195/60-15 | 90 | 166 | 263 | 310 | 322 |
| | 185/70-14 | 111 | — | — | 380 | — |

Based on the result of the aforesaid tests, the present invention requires such rubber for the sidewall-reinforcing rubber members which has a JIS hardness of not less than 70, a tensile stress $Mod_{25}$ of not less than 10 kg/cm$^2$, and a tripsometer type repulsive elasticity of not less than 65%. Here, the "aging" means the aging test conditions of JIS K6301-4, except modifications of using an inactive atmosphere, preferably nitrogen atmosphere, and keeping the test temperature at 140° C.±1° C., in view of the special characteristics of the sidewall-reinforcing rubber members.

As regards the composition of the rubber, the rubber specimens No. 1 and No. 2 use a blend rubber consisting of 50 parts of natural rubber NR and 50 parts of butadiene rubber BR, and the rubber specimen No. 1 contains 75 parts of carbon black GPF while the rubber specimen No. 2 contains 60 parts of carbon black FEF, and the contents of other ingredients of the rubber specimens No. 1 and No. 2 are similar to those of the test specimen No. 2 of Table 1. The rubber specimens No. 3 through No. 5 contain larger amounts of butadiene rubber BR and the amounts of other additives are slightly modified.

The underlined test results in Table 2 show that no damage or breakage was found on the tire side portions including the sidewall-reinforcing rubber members by inspection from the outside, but upon disassembling the tires tested, breakdowns were found at boundaries between the tread rubbers and the edges of belt layers.

TABLE 3

| Designation of test case | | | A | B$_1$ | B$_2$ | C$_1$ | C$_2$ | D |
|---|---|---|---|---|---|---|---|---|
| Physical properties of tread rubber | JIS hardness Hd | | 60 | 61 | | 62 | | 63 |
| | 300% modulus (kg/cm$^2$) | | 95 | 100 | | 105 | | 135 |
| | repulsive elasticity by Dunlop tripsometer (%) | | 35 | 40 | | 47 | | 60 |
| Sidewall-reinforcing rubber member | rubber specimen of Table 2 | | No. 1 | No. 1 | No. 4 | No. 1 | No. 4 | No. 1 |
| | max. thickness (3) (%) (one side) | | 5.4 | 5.4 | 4.4 | 5.4 | 4.4 | 5.4 |
| | weight used (g) | | 1,500 | 1,500 | 1,160 | 1,500 | 1,160 | 1,500 |
| Internal temperature (°C.) | on belt (depth 10 mm) | center | 75 | 70 | — | 65 | — | 60 |
| | | edge | 103 | 92 | — | 83 | — | 73 |
| | sidewall-reinforcing rubber member | hump (depth 10 mm) | 100 | 92 | — | 85 | — | 76 |
| | | widest point (depth 8 mm) | 93 | 89 | — | 85 | — | 78 |
| Running durability after puncture (km) | drum test (1) | | 613 | 819 | 310 | 1,251 | 820 | 1,443 |
| | field test (2) | | 205 | 313 | 85 | 375 | 220 | 435 |

Notes:
(1) With a load of 335 kg and at a speed of 80 km/hour.
(2) Air inlet valves of front wheel tires were left open, with a load of 450 kg and at a speed of 80 km/hour.
(3) Percentage of maximum thickness of sidewall-reinforcing rubber member is based on the maximum tire section width under inflated condition.

To overcome the breakdowns at the tread portions, further tests were carried out by using tires of the size 195/60-15 having tread portions made of low-heat-generating tread rubbers A through D of Table 3 and sidewall-reinforcing rubber members made of the rubber specimens No. 1 and No. 4 of Table 2. The result of those tests is also shown in Table 3. The combinations of the aforesaid tread rubbers and the sidewall-reinforcing rubber members have accomplished a remarkable improvement of the running durability after puncture, as can be seen from Table 3.

Referring to Table 3, when a tread rubber having a high repulsive elasticity of not less than 40% which indicates a low heat generation level is used, the heat generated in the sidewall-reinforcing rubber member during run-flat is effectively absorbed. Hence the internal temperature of the sidewall-reinforcing rubber member can be kept low, for remarkably improving the running durability after puncture. More particularly, by comparison of the test cases B$_2$ and C$_2$ using the sidewall-reinforcing rubber members of rubber specimen No. 4, it is apparent that the use of the tread rubber having a high repulsive elasticity can improve the running durability after puncture by 2.5 times or more.

As regards the belt layer 3 for reinforcing the tread portion TR, the tire for the test case $C_2$ of Table 3 consisted of steel cord cloths with a cut angle of 70°, and the inner cloth and a width of 171 mm while the outer cloth had a width of 160 mm. The variation of the running durability after puncture with modifications of the structure of the belt layer was checked by using the tire of the test case $C_2$ of Table 3 as a control tire. The result was as follows.

1. When the cut angle was reduced to 65°, the running durability after puncture (by drum test) was reduced to 456 km, as compared with 820 km for the control tire.
2. When the widths of the inner and outer cloths were reduced to 160 mm and 150 mm, respectively, while keeping the cut angle at 70°, the running durability after puncture was slightly reduced to 810 km.
3. On the contrary, when the inner and outer belt cloths were widened to 180 mm and 170 mm, respectively, the running durability after puncture was fairly improved to 1,030 km.
4. When a belt layer identical with that of the control tire was covered by a nylon cord cloth (190 mm wide) and the opposite edges of the belt layer were capped by edge portions of the nylon cloth, so as to produce the capped belt structure, the running durability after puncture was greatly improved to 1,270 km, or improved by about 50%.
5. When the widths of the inner and outer cloths of the belt layer were widened to 240 mm and 165 mm, respectively, and the oppsoite edges of the inner cloth were folded back so as to form a 170 mm wide belt of the folded structure, the running durability after puncture was improved to 1,135 km, or a similar improvement to that of the capped belt structure was achieved.
6. When the same folded belt structure of the belt layer as that of the preceding paragraph 5 was formed while using a KEVLAR cord cloth as the outer cloth, the running durability after puncture was improved to 1,790 km, or doubled as compared with that of the control tire.

As described in the foregoing, according to the present invention, the run-flat condition characteristics of a pneumatic safety tire has been so improved that continuous driving after puncture can be ensured without deteriorating the repairableness of the tire, regardless of any delay in finding the tire puncture or under any unfavorable conditions normally expected in regular automobile driving. Accordingly, the need for undertaking a dangerous tire change operation on a heavily trafficked road can be completely eliminated.

The sidewall-reinforcing rubber members 2 to be used in the present invention are disposed on the inner hollow space side of the tire sidewall SW, more particularly attached to the inner surface of an inner rubber layer if such inner rubber is used, or disposed between the inner rubber layer and carcass plies 1, or attached to the inner surface of the carcass plies, or disposed between carcass plies. The sidewall-reinforcing rubber member 2 has a crescent-shaped cross section, namely, the thickness of the sidewall-reinforcing rubber member gradually increases from its one end at the tire bead portion BE until reaching the maximum thickness, and then its thickness gradually decreases as it extends toward the tire hump or further to the tread center. Thus, each sidewall-reinforcing rubber member is of annular belt-shape extending continuously in the circumferential direction of the tire as an integral part joined with the tire rubber. The maximum thickness of the sidewall-reinforcing rubber member relates to its hardness and is determined so as to bear the wheel load by cooperating with the tire sidewalls, and is preferably 4% to 9% of the maximum tire section width under inflated condition.

The sidewall-reinforcing rubber member may contain short fibers, threads, cloths or other reinforcing elements, provided that the aforesaid heat-generating and heat-resisting characteristics are not adversely affected thereby. Such reinforcing elements may be advantageous from the standpoint of reducing the tire weight by the corresponding reduction of the amount of rubber, which may also lead to a cost reduction, and from the standpoint of ensuring various performance characteristics of a high-speed tire.

The present invention can be advantageously applied to passenger car tires, especially radial tires for passenger cars, and also to tires for working cars with a comparatively low wheel load.

Although the present invention has been described with a certain degree of particularlity, it is understood that the present disclosure has been made only by way of example and that numerous changes in details of construction and the combination and arrangement of parts may be resorted to without departing from the scope of the invention as hereinafter claimed.

What is claimed is:

1. A pneumatic safety radial tire with excellent long-running ability after puncture, comprising a pair of annular bead portions, a carcass extending across the two bead portions, an annular tread portion formed on the outer peripheral surface of the carcass, a pair of sidewalls between one of the bead portions and corresponding one of opposite edges of said tread portion, a pair of rubber reinforcing members mounted to said sidewalls for enhancing rigidity thereof so as to give an ability to bear load on the tire independently, and a tread reinforcing belt layer embedded in tread rubber forming said tread portion while surrounding said carcass, said rubber reinforcing members consisting of an elastomer having a JIS hardness of not less than 70, a tensile stress ($Mod_{25}$) of not less than 10 kg/cm$^2$ after an aging test for 24 hours in an inactive atmosphere at 140° C.±1° C., and a repulsive elasticity by Dunlop tripsometer of not less than 65%, while said tread rubber consisting of an elastomer having a repulsive elasticity by Dunlop tripsometer of not less than 40% together with regular characteristics.

2. A pneumatic safety radial tire as set forth in claim 1, wherein said tread reinforcing belt layer comprises at least two annular belts of different widths and opposite edges of a wider one of said belts are folded back onto opposite edges of a narrower one of said belts.

3. A pneumatic safety radial tire as set forth in claim 2, wherein said belt to be folded comprises KEVLAR cords.

4. A pneumatic safety radial tire as set forth in claim 1, wherein opposite edges of said tread reinforcing belt layer are covered by caps comprising cloths of organic fiber cords.

5. A pneumatic safety radial tire as set forth in claim 4, wherein said cap comprises nylon cord cloth.

* * * * *